(12) United States Patent
Turner et al.

(10) Patent No.: US 8,539,968 B2
(45) Date of Patent: *Sep. 24, 2013

(54) CAR WASH SYSTEM WITH LIGHTED SPRAY ARMS AND METHOD OF MAKING SAME

(75) Inventors: Barry S. Turner, Novi, MI (US); Thomas E. Weyandt, Northville, MI (US); Jerry Alan Kotrych, Livonia, MI (US)

(73) Assignee: Belanger, Inc., Northville, MI (US)

( * ) Notice: Subject to any disclaimer, the term of this patent is extended or adjusted under 35 U.S.C. 154(b) by 107 days.

This patent is subject to a terminal disclaimer.

(21) Appl. No.: 13/025,432

(22) Filed: Feb. 11, 2011

(65) Prior Publication Data

US 2011/0277792 A1    Nov. 17, 2011

Related U.S. Application Data

(60) Provisional application No. 61/333,480, filed on May 11, 2010.

(51) Int. Cl.
*B08B 3/02* (2006.01)

(52) U.S. Cl.
USPC ............ 134/113; 134/123; 134/198; 134/199

(58) Field of Classification Search
None
See application file for complete search history.

(56) References Cited

U.S. PATENT DOCUMENTS

| | | | | |
|---|---|---|---|---|
| 7,438,075 B1 * | 10/2008 | Huntington et al. | ........ | 134/57 R |
| 2009/0147504 A1 * | 6/2009 | Teeters | .......................... | 362/153 |

* cited by examiner

*Primary Examiner* — Michael Kornakov
*Assistant Examiner* — Ryan Coleman
(74) *Attorney, Agent, or Firm* — Young Basile Hanlon & MacFarlane PC

(57) ABSTRACT

A touchless, automatic spray-type car wash system includes one or more arms delivering washing fluids wherein the arms are constructed with translucent plastic sleeves which can be illuminated from within by LEDs. Different colors for the arm or arms can be coordinated with wash process steps. Signage can be provided in the bay and can include panels which are illuminated in a sequential fashion coordinated with arm illumination colors to inform the driver as to each step being performed.

15 Claims, 9 Drawing Sheets

CAR WASH SYSTEM WITH LIGHTED SPRAY ARMS AND METHOD OF MAKING SAME

CROSS-REFERENCE TO RELATED APPLICATION

This application claims the benefit of U.S. provisional patent application Ser. No. 61/333,480 filed May 11, 2010; the entire content of which is incorporated herein by reference.

FIELD OF THE INVENTION

The present invention relates to car wash systems of the touchless automatic type wherein the washing action is provided by one or more spray arms which are lighted.

BACKGROUND OF THE INVENTION

Touchless automatic car wash systems in which a spray mechanism moves over and/or around a stationary vehicle have become popular due to the facts that they do not make physical contact with the painted or glass surfaces of the vehicle and take up less space than so-called conveyor washers. They are often installed in automobile dealerships as well as in smaller dedicated structures adjacent or connected to convenience stores and gas stations.

Au example of a modern touchless automatic car wash system can be found in U.S. Pat. No. 6,372,053 issued Apr. 16, 2002 and reissued Aug. 26, 2008 as RE 40,463 and assigned to Belanger, Inc. of Northville, Mich. This patent describes a spray-type car wash system in which a carriage is mounted overhead in a car wash bay and provided with a drive system which allows the carriage to move forward and backward on parallel overhead rails. A shuttle mounted on the carriage allows lateral movement as well. Depending from the shuttle are one or more spray arms which can be programmed to travel around a vehicle while directing sprays of washing and rinsing fluids at all exterior surfaces of the vehicle.

SUMMARY OF THE INVENTION

According to a first aspect of the invention, a touchless automatic car wash apparatus comprises a longitudinally movable overhead carriage, at least one spray arm pivotally depending from the carriage and capable of at least partly circumnavigating a vehicle in the bay to perform one or more car wash functions involving the dispensing of fluids. In accordance with the invention, the arm carries a fluid supply conduit having spaced nozzles along its length to deliver washing and/or rinsing fluids. The arm also comprises a translucent hollow sleeve, preferably made of a resilient plastic, at least the majority of which depends downwardly from the overhead carriage. In addition, a lighting system is placed within the sleeve. This system may comprise, for example, one or more strips of LEDs effective to produce various lighting effects which are visible to occupants of a vehicle being washed. The sleeve usually, but not necessarily, encloses most or all of the fluid supply conduit and nozzles.

In accordance with a preferred embodiment of the invention, the distributed illumination system comprises one or more strips of multi-colored LEDs which are capable of being illuminated in single colors or in combinations of color to produce a variety of colors within the arm; i.e., an RBG LED set can produce multiple colors in addition to the basic red, green and blue by combining two or more colors at one time. These colors can be coordinated to the steps performed during the wash program; e.g., a first color can be used to draw attention to the arm in a pre-wash position; a second color for a pre-soak fluid delivery; a third color can be used during the delivery of a wash fluid; a fourth color can be produced during the delivery of a rinse fluid and so on. In addition or alternatively, other lighting effects can be provided in combination with or independently of color; for example, the lights within the sleeve can be caused to flash for any of various purposes, including navigational assistance to a driver entering the wash area.

Because the sleeve is translucent and, in the preferred form, somewhat light-diffusive, the sleeve hides the supply conduit, if mounted within the sleeve, and also hides the LED mounts from view, showing only a distinctive elongate expanse of light. The sleeve can be rotomolded, in which case it is tubular (cylindrical), but can also be made in other shapes by other techniques.

Further in accordance with the preferred embodiment, a sign may be provided in the wash bay so as to be visible to an operator of the vehicle being treated. The sign may comprise a number of panels which, for example, can be stacked in vertical array, each panel indicating a different phase or step within a car wash program. These panels may also be equipped with lights which are coordinated to the colors of illumination provided in the spray arm or arms. Accordingly, the customer sitting in the vehicle is fully informed as to the nature of each step in the car wash sequence being performed.

As further discussed herein, the sleeve which is used to construct a spray arm or arms is preferably made of a translucent plastic which is soft and flexible so as to provide resilience or "give" to prevent denting or splintering if an inadvertent collision between the arm and a vehicle occurs. A polymer, such as high density polyethylene (HDPE), containing an EVA component is preferred for this purpose. Of course, other plastics and other elastomers can also be used. In addition, the composition of the plastic is preferably a milky or neutral semi-opaque color so as to more or less hide the internal structure of the spray arm which, at the same time, transmitting light from the illuminated LEDs within the sleeve.

A second aspect of the invention described herein is a method of operating a car wash system having one or more spray arms which are capable of at least partly circumnavigating a vehicle during a wash sequence including the steps of activating a sequence or program of movements for the arm and, while that sequence is being carried out, activating a distributed light system visible through the outer shell (sleeve) of the arm to produce visual effects for various purposes. The term "wash sequence" is used herein to refer to all of the steps which can be involved in a commercial car wash including, by way of example, pre-wash, wash, rinse, wax and other special chemical treatment, undercarriage wash, and drying. The term "car" refers to all types of automotive vehicles including large trucks and busses.

In accordance with the method invention described herein, the car wash system having one or more lighted, depending, laterally-opposed spray arms is operated in the manner described above to convey navigational information or wash system progress information, or both, to the occupant of a vehicle undergoing a wash sequence in the system.

In general, this is accomplished in the method aspect by strategically positioning the arm or arms and creating a first distinctive lighting effect; e.g., flashing the area lights, after receiving a signal that a vehicle is about to enter the wash bay. Once the vehicle is in position and a wash sequence begins, the lighting effect may progress through a series of different colors to show progress through different phases of the sequence. Red may represent a prewash, yellow a washing phase, and blue a rinsing phase. Still a fourth color may be used to indicate progress through a drying phase if drying equipment is provided. Flashing can be added to provide even more variations.

After the wash sequence, the lighting effects may go to a final state such a return to an unlighted or neutrally steady state lighted condition thereby to signal to the driver of a vehicle that the washing sequence has been completed and that the vehicle should exit the bay.

These phases and lighting effects may be explained by appropriate signage in the car wash bay if the owner operator deems such to be desirable. LEDs and plastics for the sleeves are available in multiple colors and no limiting commitment to specific colors or effects is intended by this description.

The method described above can be carried out or implemented in a car wash system having, for example, a pay station which receives credit cards, debit cards, currency or tokens, or simply pushbutton entries to show that a vehicle is ready to enter the system. That pay station may be electrically associated with a general purpose microcontroller or microcomputer to place the system in an initial "armed" condition thereby to turn on the lighting system as described above. Ultrasonic, optical, drive-over hoses or other types of sensors may be used to indicate that a vehicle has entered the bay and is in position to be washed. This information is conveyed to the controller to start the washing sequence. At the same time, a light sequence program in storage associated with the controller is used to cause the lighting effects to sequence through the various stages as described above. The output of the controller is connected through a suitable interface system such as, for example, the interface system described in U.S. Pat. No. 5,883,816 so as to provide appropriate actuation to the various pumps, motors, valves, solenoids and other equipment normally found in rollover car wash systems as categorically described herein.

BRIEF DESCRIPTION OF THE DRAWINGS

The various features, advantages and other uses of the present invention will become more apparent by referring to the following detailed description and drawing in which.

DETAILED DESCRIPTION OF THE ILLUSTRATIVE EMBODIMENTS

Figure 1:
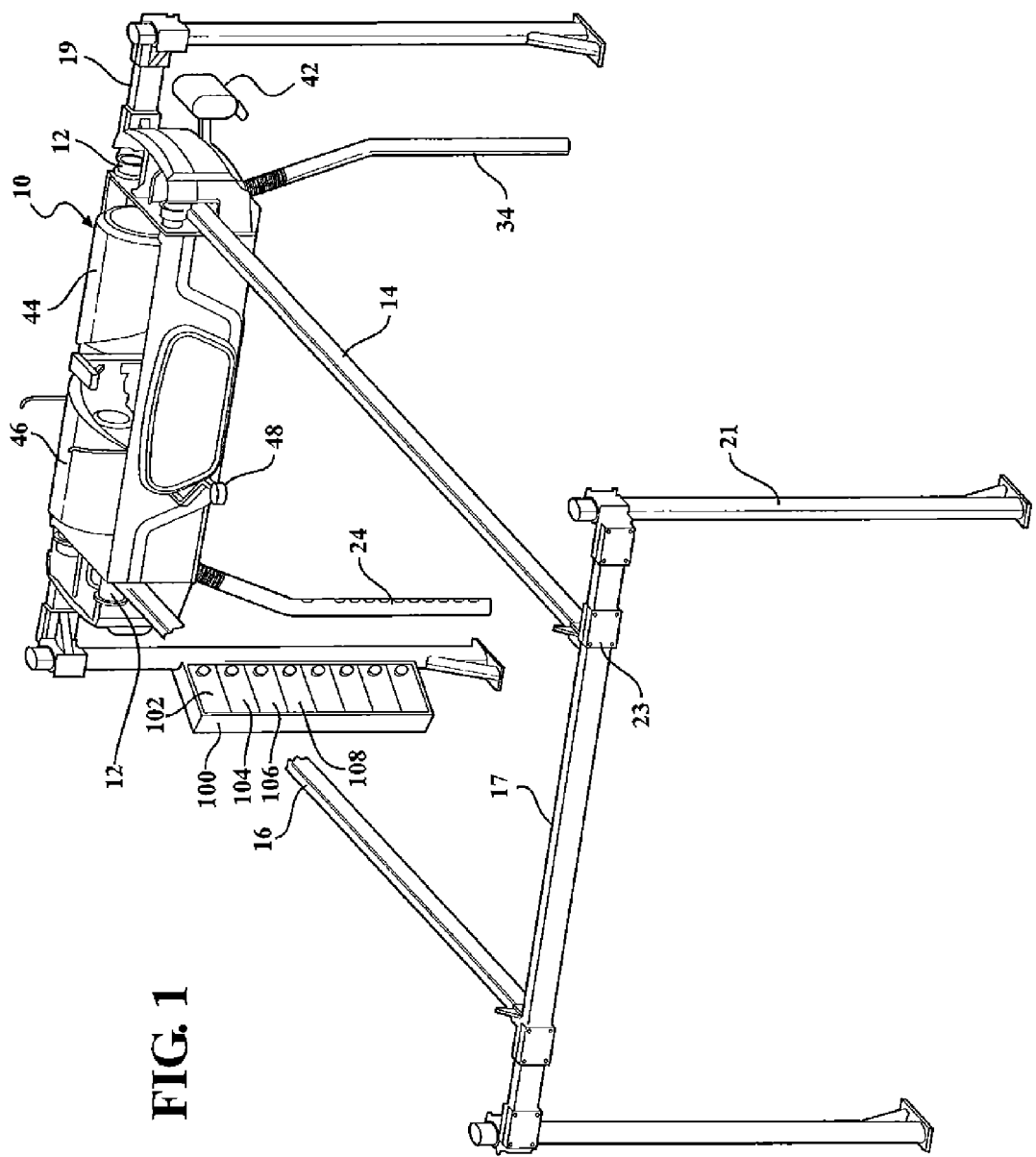
FIG. 1 is a perspective view of a car wash system embodying the apparatus inventions described herein.

Referring to the drawings, a touchless, automatic car wash system embodying the subject matter generally described above comprises a overhead carriage 10 having four rollers 12 resting on parallel overhead rails 14, 16. Two of the rollers are drive wheels and are connected by half-shafts to a motor/gearbox combination to move the carriage 10 longitudinally along the rails. The rails 14, 16 are attached by adjustable brackets 23 to cross-rails 17, 19 which in turn are supported by vertical posts 21. The height of the posts 21 and the length of the rails 14, 16, 17, and 19 are such as to define a wash bay which is large enough to receive most, if not all, vehicles of the type to be washed; e.g., passenger cars. While the dimensions of the structure may be chosen to suit the application, a system to wash passenger cars, light trucks, SUVs and crossovers may be about 25 feet in length. The bay may be fully or partially enclosed as desired. A space to store chemicals for carwash operations will also typically be provided.

Attached to the carriage 10 by gears (not shown) and disposed essentially immediately under the carriage 10 left and right horizontal arms 18, 20 which are attached to a drive motor/gearbox set so they can be driven in mirror image directions, as is more fully described in the aforesaid U.S. Pat. No. RE 40,463, the disclosure of which is incorporated herein by reference. Arms 18, 20 may carry exposed horizontal spray manifolds (not shown). Attached to and depending downwardly from the outer ends of arms 18, 20 are spray arms 24, 34.

Figure 2:
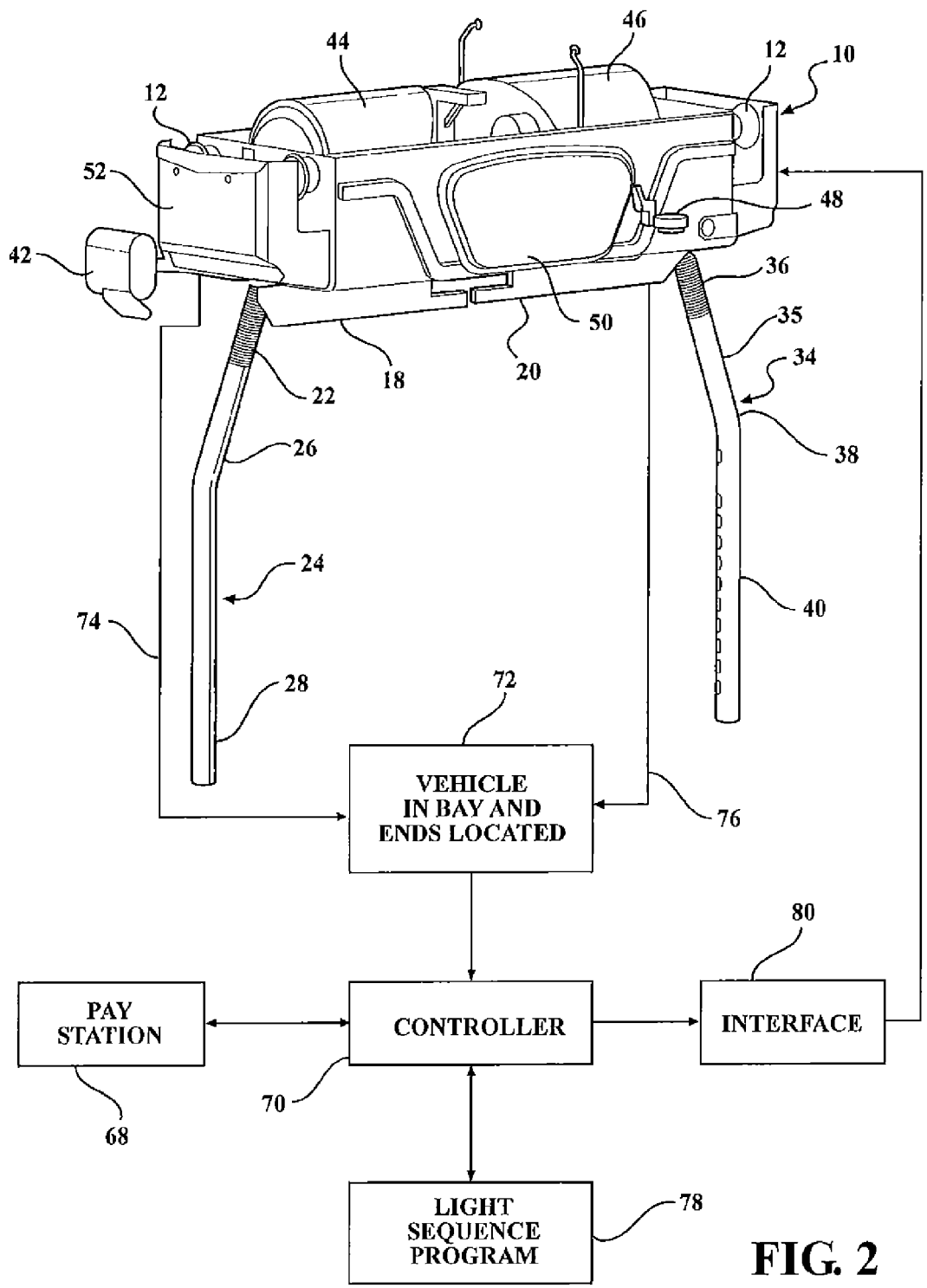
FIG. 2 is a perspective view of the car wash system of FIG. 1 further indicating the general nature of the control system involved in carrying out the method invention described herein.
Figure 3:
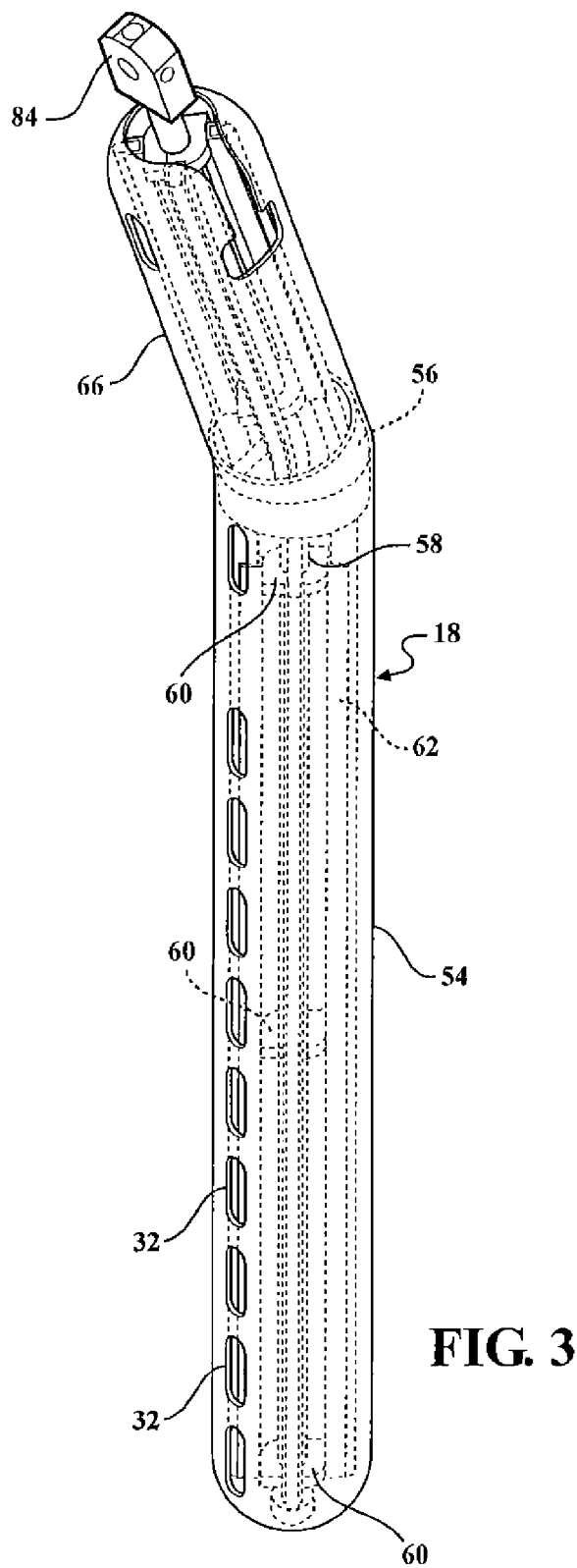
FIG. 3 is a perspective view of a first spray arm with interior components shown in phantom.
Figure 6:
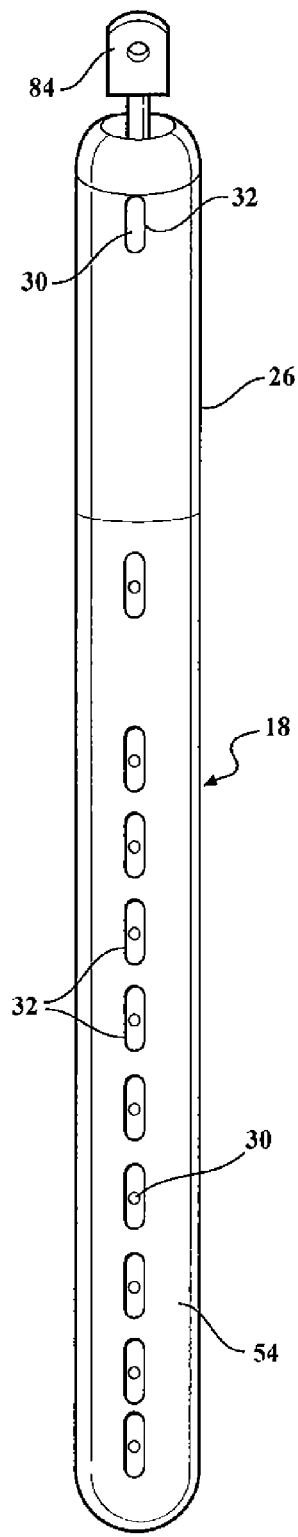
FIG. 6 is a side view of the spray arm of FIG. 3.
Figure 7:
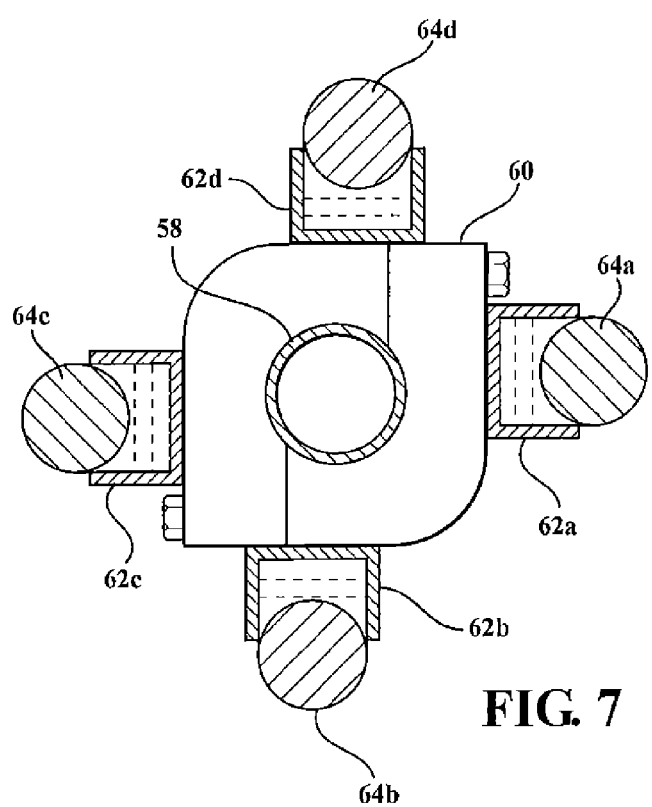
FIG. 7 is a cross-sectional view through the spray arm at a location where an internal bulkhead is mounted.
Figure 8:
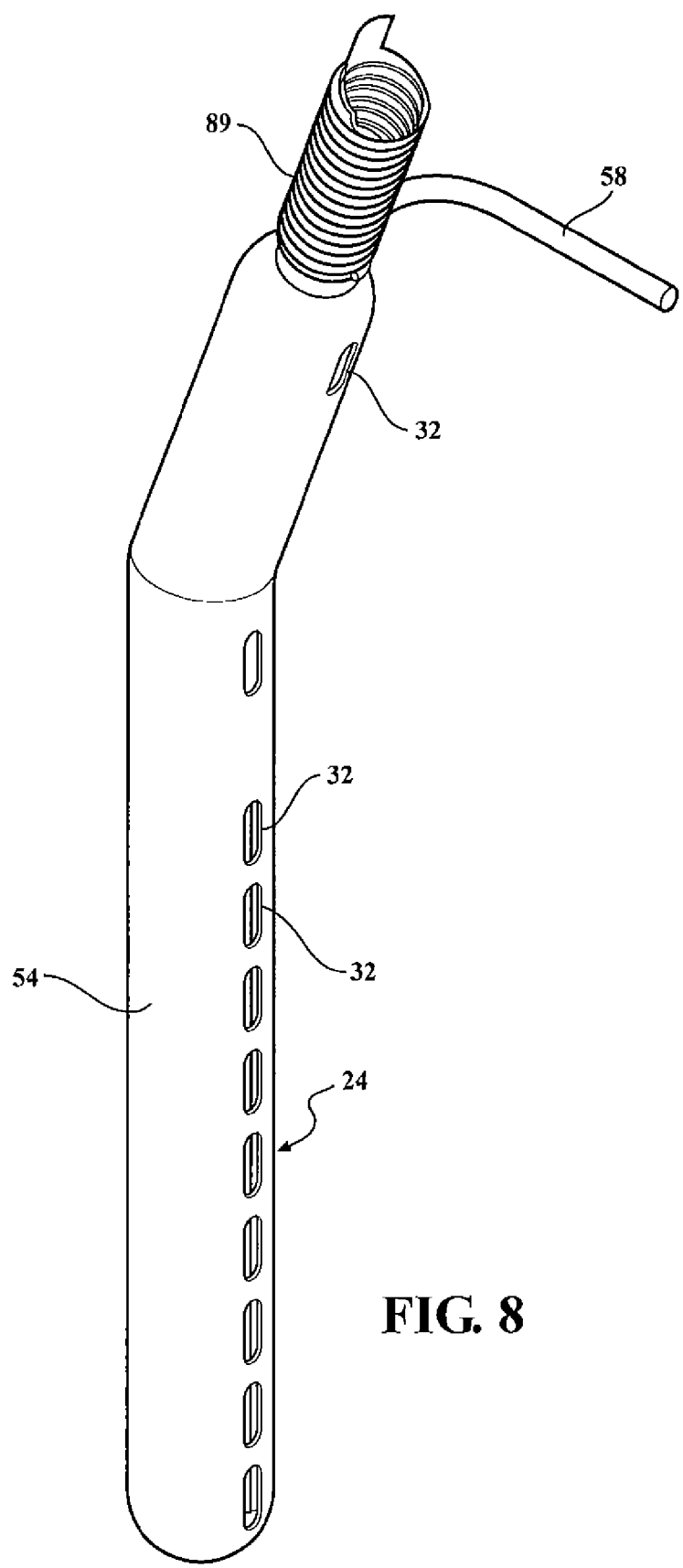
FIG. 8 is a perspective view of a spray arm having angled upper portion and a soft plastic shell of the type generally described above.
Figure 9:
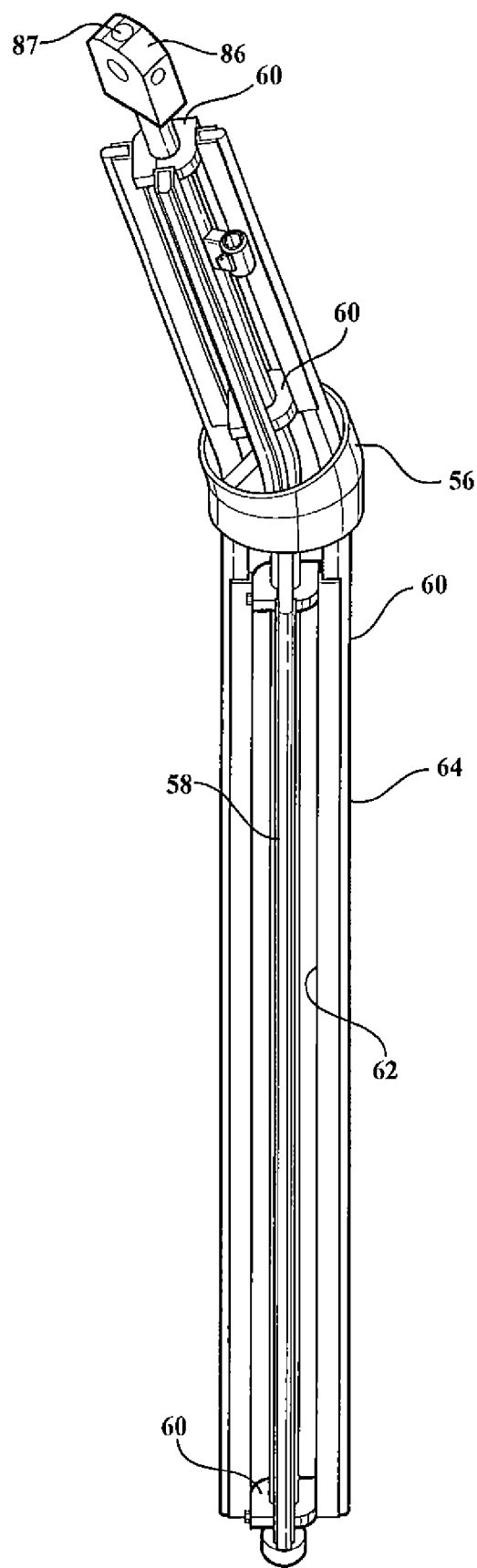
FIG. 9 is a perspective view of an internal construction for a representative spray arm.

As shown in FIG. 2, Arm 24, has an upper portion 26 which is angled approximately 20° from vertical and a lower portion 28 which is fully contiguous with the upper portion 22. Similarly, arm 34 has an angled upper portion 35 and a vertical lower portion 40. The upper and lower portions of each arm carry a fluid delivery conduit 58 having attached to it spray nozzles 30 which are effective to direct streams or jets of different washing and rinsing fluids toward the exterior surface of an automobile in the bay at selected pressures according to the speed of a multi-speed pump (not shown). Nozzles 30 are arranged along the arms 24, 34 to coincide with elongate slots 32 which are formed in the side surfaces of plastic sleeves 54 which form part of each of the depending arms 24, 34 as best shown in FIGS. 3 and 6. The inwardly angled upper portions 26, 35 of the depending arms 24, 34 are preferred for the reason that most passenger cars are narrower at the top or roof line than they are across the lower body. However, a 90° transition between the horizontal arms 18, 20 and depending arms 24, 34 can also be used. In addition, a rectangular frame can be constructed with spray manifolds angled across the upper joint as another possible construction. The sleeves for arms 24, 34 are about 6 to 8 inches in diameter are molded from a plastic resilient EVA-containing plastic such as polyethylene as hereinafter described. Other flexible materials can also be used.

While the present embodiment is being described with reference to a system having two spray arms 24, 34, the illumination aspect of the present invention can also be used in systems having only one arm, as described more fully in co-pending application Ser. No. 13/025,466 filed concurrently herewith and assigned to Belanger, Inc.

The carriage 10 carries foam dispensers 42 on both sides aimed downwardly and inwardly toward a vehicle between the arms and spaced one or two feet ahead of the arms so as to avoid interference with the spray pattern. Scroll-type blowers 44, 46 are mounted in the overhead carriage 10 with outlets (not shown) directed downwardly to remove water droplets from a washed vehicle. Additional blowers (not shown) may be mounted to the sides of the verticals 21 at the exit end of the bay to dry the sides of the vehicle as shown in U.S. Pat. No. 6,123,503 issued Sep. 26, 2000 and assigned to Belanger, Inc., also incorporated herein by reference. The nature and construction of the blowers 44, 46 is more fully described in the co-pending application Ser. No. 11/687,723 filed Mar. 19, 2007 and assigned to Belanger, Inc. The content of that pending application is incorporated herein by reference.

In addition, downwardly aimed ultrasonic sensors 48 are mounted on outwardly extending arms on both front and rear of the carriage 10 (only the front sensor 48 is shown) to serve multiple purposes including (a) the generation of signal detecting the presence of the vehicle in the bay thereby to initiate a wash sequence only if a vehicle is present, and (b) finding the forward and rear ends of the vehicle. Programming is also provided in controller 70 to modify the extent of longitudinal travel of the carriage 10 during the washing and rinsing operations according to the calculated length of a vehicle in the bay. This feature is provided in recognition of the fact that commercially available passenger vehicles vary substantially in length and it is desirable for purposes of economy to spray chemical/fluids only when a portion of the vehicle is in the target area.

A lighted logo panel 50 is provided on the front surface of the carriage 10 as best shown in FIGS. 1 and 2. Cabinet doors 52 can be provided on the lateral sides of the carriage 10 to afford access to machinery components. The carriage is, of course, supplied with electricity and fluids (water with suitable chemicals) by conduits and cables (not shown) well known to persons skilled in the car wash construction art.

As shown in FIGS. 3, 5, 6 and 12, each arm is provided with an outer plastic casing or sleeve 54 made of a resilient, translucent plastic such as HDPE with an EVA component. and of sufficient wall thickness to provide shape retention but thin enough and with enough resilience to afford some "give" if inadvertently contacted by a vehicle. Various plastics can be used but some EVA content is preferred to give the sleeves resilience for soft impact performance and dent resistance. The plastic of the sleeves 54 is preferably translucent rather than see-through clear, and can be in any of a variety of colors to complement LED colors. Alternatively, the plastic can be of a neutral or "milky" appearance to provide color through various colored LEDs as hereinafter described in greater detail. The sleeves can be open or closed on the bottoms.

Figure 10:
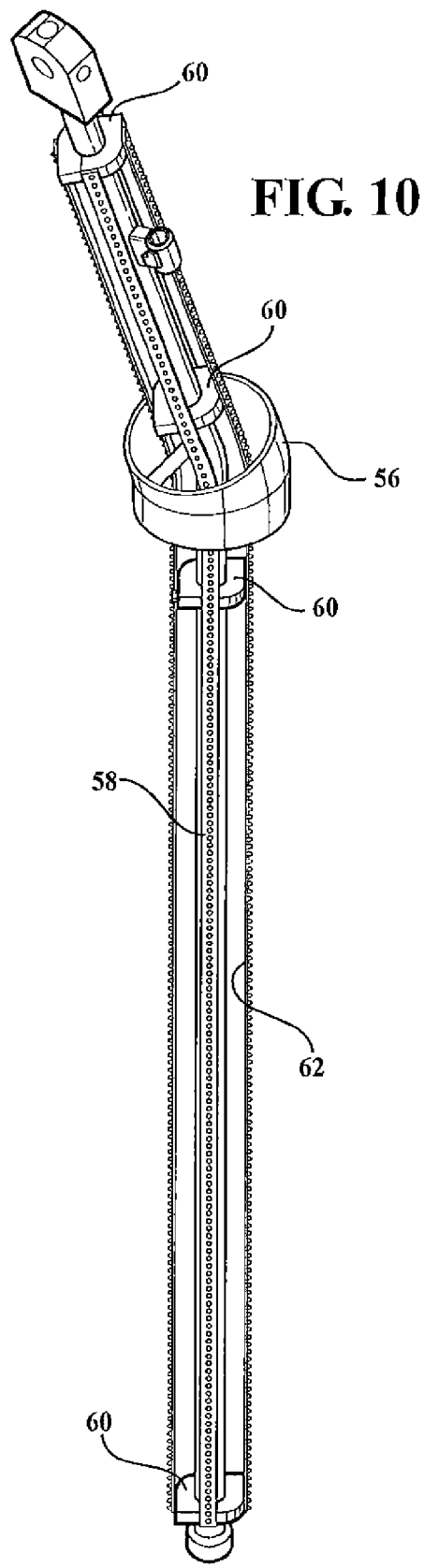
FIG. 10 is a perspective view of an alternative internal structure for a second embodiment of a spray arm.
Figure 11:
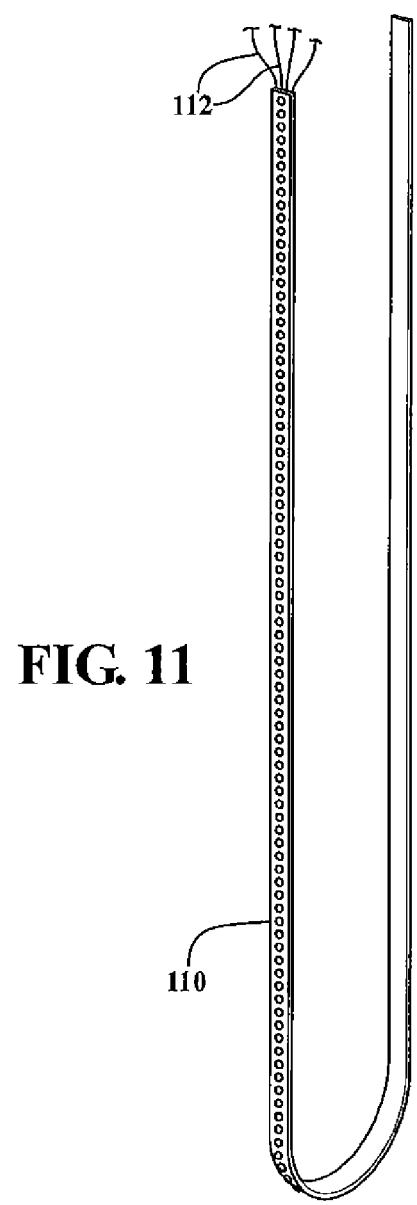
FIG. 11 is a perspective view of an LED light strip using RGB LEDs in a substantially continuous strip which can be located within the soft plastic sleeve of a depending spray arm.

An illustrative internal structure of the arms 24, 34 is shown in FIGS. 3, 4, 5, 6, 7 and 9 and an alternative structure is shown in FIG. 10. The structure of FIG. 3 comprises aluminum blocks 60 which act as bulkheads. The shape of these blocks can vary, particularly at the corners, but are such as to provide four flat edge surfaces at 90° intervals thereby to receive extruded aluminum channels 62a through 62d which are screwed to and between the bulkheads 60 to create a rigid skeletal structure within each arm. A mitered two-part transition collar 56 also made of aluminum, is provided to accommodate the angle between the upper and lower portions 26, 28 represented by the sleeve portions 66 and 54, respectively.

Each block 60 is bored out in the center to accommodate the fluid supply pipe 58 which is preferably made of stainless steel and which in a commercial embodiment has an outer diameter of 1¼ inches to supply adequate fluid to the nozzles 30. Pipe 58 bypasses a breakaway joint and reconnects to a horizontal supply pipe (not shown) in one of the horizontal arms 18, 20. A breakaway joint for connecting the depending arms 24, 34 to the horizontal pivot arms 18, 20 is described in application Ser. No. 13/025,447 filed concurrently herewith, the entire content of which is incorporated herein by reference.

Each of the channels 62 receives a length of flexible LED-based lighted strips 64a through 64d. The structure of the strip lighting is such as to provide a solid translucent plastic rope portion backed by an encased LED/circuitry section, the latter being essentially rectangular in cross-section so that the LED strip 64 can be press-fit into the channels 62 and held in place either by friction or by adhesive or by a combination of the two. This is shown in FIG. 4.

Figure 4:
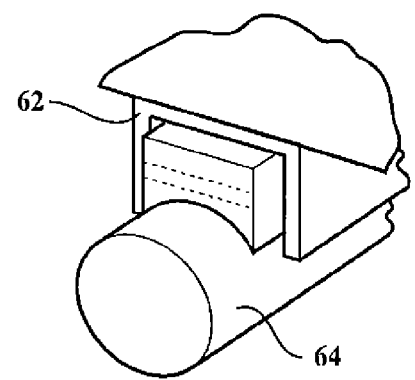
FIG. 4 is a perspective view of a detail of the lighting system in the spray arm of FIG. 3.
Figure 5:
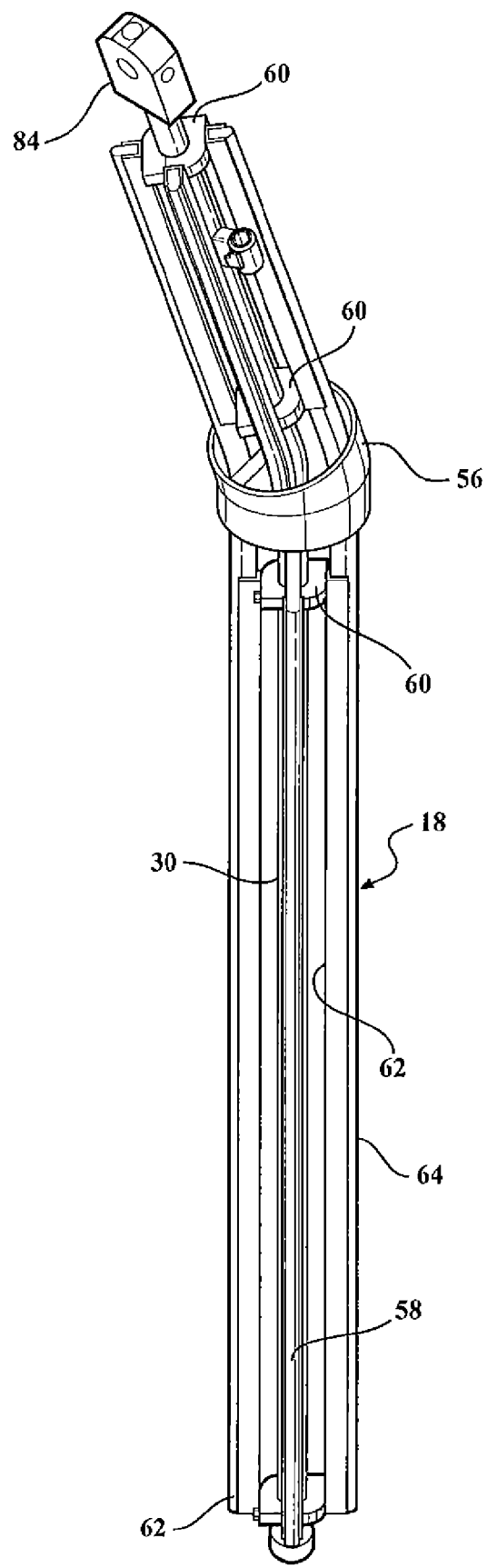
FIG. 5 is a perspective view of the internal details of the spray arm of FIG. 3 with the translucent plastic cover removed.

The LED strips 64 shown in FIG. 4 are of a single color but a more economical construction having multi-color capability is preferred and is shown in FIGS. 10-13.

As also shown in FIG. 1, the car wash apparatus is further equipped with a sign 100 which is stationed and oriented relative to the base so as to be visible to the driver of a vehicle in the bay. Sign 100 comprises a plurality of vertically stacked translucent panels 102, 104, 106, 108, etc., each of which can be provided with indicia describing the nature of the wash step being performed at any given time. In addition, each panel can be illuminated in whole or in part with a color which is coordinated to the color of the spray arm or arms performing that particular step at any given time. The driver of the vehicle can normally see the arms and the sign and can confirm, by matching colors, that a particular step in the car wash sequence is being performed.

At the top of the internal skeletal structure of each arm is a detent block 84 having a smooth partly arcuate race surface 86 and a center detent concavity 87 to receive a spring-loaded ball described in the co-pending application Ser. No. 13/025,447, filed concurrently herewith.

Turning to FIG. 2 of the drawings, the carriage 10 together with the depending arms 24, 34 are shown in combination with components which make up an operating system to take maximum advantage of the lighting effect which is produced by the combination of the light strips 64 within the interior of the cylindrical plastic sleeves which make up the outer skins of the arms 24, 34. These components comprise a pay station 68 which serves the function of initiating the system by accepting an input representing the appearance and willingness of a customer to utilize the system. The pay station 68 may comprise a coin, bill, token or credit card receiver or a keyboard and may be wholly or partly remote from the wash bay, depending on whether the enterprise employing the invention is to be operated with or without attendant participation.

The pay station 68 produces electrical signals which are communicated to a controller 70 which may be a microcontroller or microprocessor having a memory 78 in which both a light sequence program and one or more systems operations sequences are stored. The system further comprises a "vehicle-in-bay" signal generator connected to the carriage 10 by way of signal lines 74 to provide signals from, for example, a treadle or electric eye or, preferably from one or both of the downward looking ultrasonic sensors 48 which detect the presence of a vehicle in the bay. The sensors 48 also find the ends of the vehicle by traveling from one end of the rails 14, 16 to the other and programming the length of carriage movement during the wash sequence. This information is fed to controller 70. In short, it is undesirable to activate the system with no vehicle present even though the pay station 68 may indicate the arrival of a customer. It is desirable to activate the system when a vehicle is in the bay and to determine its overall length.

Figure 12:
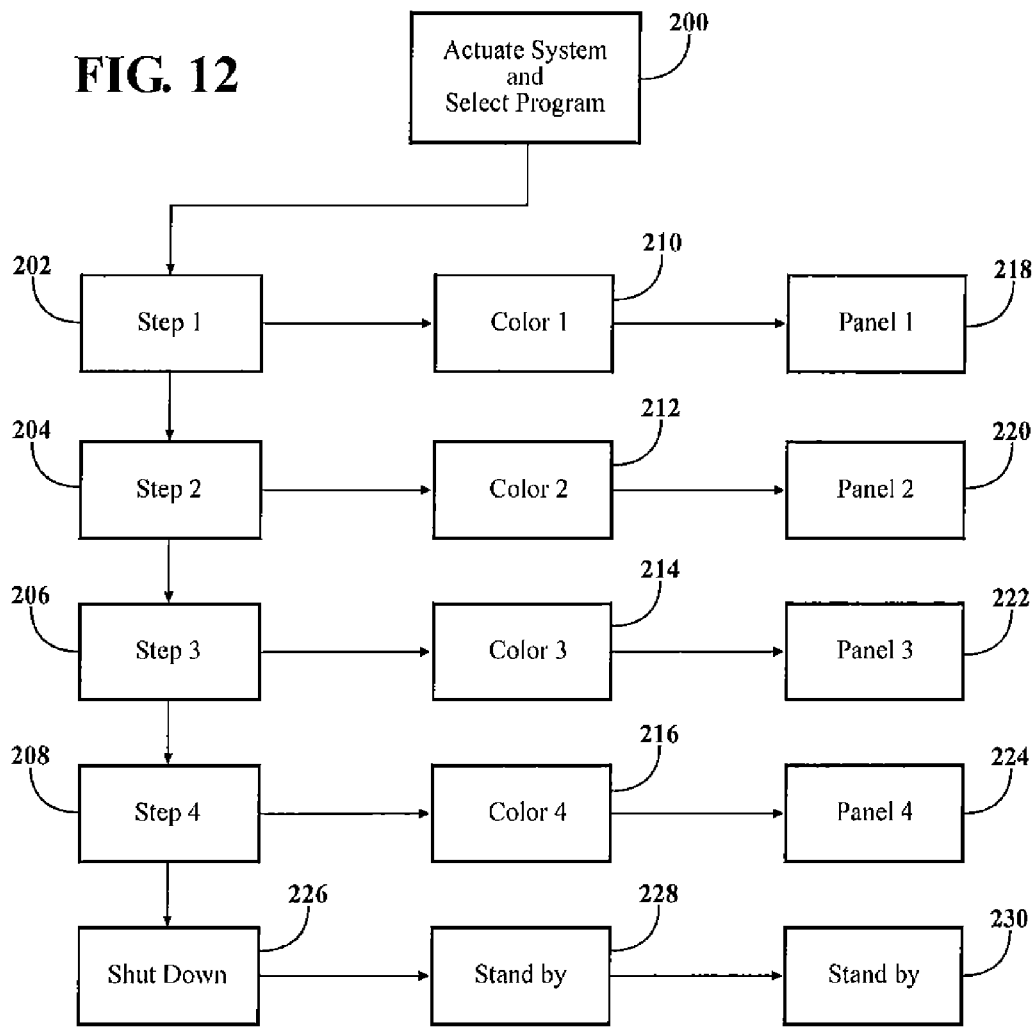
FIG. 12 is a flow diagram of a sequence of operations of the system of FIG. 1 in accordance with the method invention described herein.
Figure 13:
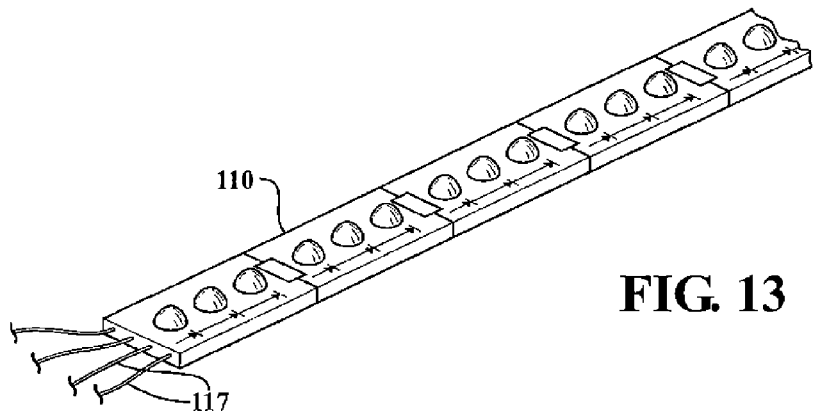
FIG. 13 is a detailed drawing of an LED strip containing a substantially continuous arrangement of RGB LEDs.

Referring to FIGS. 10, 11, 12 and 13, another more preferred embodiment of the invention is described. In this embodiment, the single-color LED strips 64 of the previous embodiment are replaced with long pliable strips 110 of RGB LEDs excitable by lead wires 112. Lead wires 112 represent the RGB colors as well as a ground wire. These wires allow for the LEDs to be illuminated in individual red, green, blue colors as well as in combinations to provide shades of different colors as well as white. Typically, two to four strips 110 are located within a milky translucent plastic sleeve 54 which diffuses light such that the light from the LEDs appears to fill the entirety of the sleeve in a substantially even fashion from top to bottom and from side to side rather than operating as point sources or lines within the sleeve. If two strips 110 are used, they are looped at the bottom to run down one side of the arm and up the opposite side. The spacing of the LEDs in the strips 110 can vary substantially depending on power level and the optical or diffusing effect of the plastic sleeve within which the LEDs are located. They are preferably but not necessarily close enough together and of sufficient number to "fill" the sleeve with what appears to the customer as uniformly distributed light. As shown in FIG. 13, the strips 110 are generally of a composite nature with conductor bridges between the elements thereof, such devices being readily commercially available from a number of different manufacturers. This multi-color LED embodiment is used in combination with the multi-colored sign 100 and the colors of the arms are coordinated during the wash to the colors of the sign panels.

Referring now to FIG. 12, an illustrative method of operating the apparatus described immediately above is given. When a vehicle approaches the wash bay and places coins or tokens or the like into a pay station 68 or otherwise operates an input device such as a keypad, a controller 70 activates the system as illustrated in block 200. According to the amount of money and/or the selection process carried out by the customer or attendant, block 200 includes a step which will select a particular program from memory which may vary from a simple two-step wash, rinse program to a much more elaborate program. This more elaborate program may consist of steps 202, 204, 206, 208 which can, for example, represent presoak, wash, rinse and dry. For each of the steps 202, 204, 206, 208, a distinct color or other lighting effect is selected for the illumination of the spray arm or arms being used in carrying out the step. This color selection is represented by program blocks 210, 212, 214, 216. Other steps can be added to the program at extra cost; e.g., wax application, undercarriage wash, wheel treatment, rust-prevention and so on.

At the same time, a panel in sign 100 is illuminated as represented by program blocks 218, 220, 222, 224. As indicated above, this may involve simply illuminating the panel to highlight indicia or it may additionally involve activating a color source such as a strip of LEDs to provide a color in the sign panel which corresponds to the color in the selected blocks 210, 212, 214, 216. In short, the sign color displayed at any given time corresponds to the arm color selected at the same time.

After all of the steps in the sequence have been completed, the mechanical system will go to a shut-down mode as represented by block 226. This causes the lighting system within the arm to assume a standby color represented by block 228. This "color" may vary between no light at all or lighting in a neutral color which is coordinated with intelligence provided to the driver to indicate that the wash cycle has been completed. Other visual effects can be used such as blinking or a sign can be activated to show the driver that it is time to exit the car wash. The sign 100 also assumes the stand-by color as represented by block 230.

It will be understood that the system and the three inventive areas found generally therein has been described with reference to an illustrative embodiment and that the foregoing description is not to be construed as limiting the inventions.

What is claimed is:

1. A spray-type car wash apparatus comprising:
   at least one spray arm dependingly vertically mounted from an overhead carriage in a wash area;
   said arm carrying a fluid supply conduit extending substantially the entire vertical length of said arm and having spaced nozzles therealong, and a generally translucent elongate sleeve enclosing substantially the entire vertical length of said conduit; and
   a distributed illumination system within the sleeve and operative to substantially evenly illuminate the sleeve along substantially its entire vertical length.

2. An apparatus as defined in claim 1 wherein the illumination system comprises a plurality of spaced-apart LEDs disposed within the interior volume of the sleeve.

3. An apparatus as defined in claim 2 further comprising a control device for selectively providing one or more of a plurality of illumination modes for the LEDs.

4. An apparatus as defined in claim 3 wherein the control device can illuminate the LEDs in different colors.

5. An apparatus as defined in claim 4 wherein the colors are red, green and blue and combinations thereof.

6. An apparatus as defined in claim 3 wherein the spray arm can be operated in a plurality of different movement and fluid-dispensing modes.

7. An apparatus as defined in claim 1 further comprising a visual sign located where it can be seen by a driver of a vehicle in the wash area and providing a plurality of messages corresponding to a set of wash sequence steps carried out using the spray arm.

8. A spray-type car wash system comprising:
   a pair of reversely similar spray arms vertically dependingly mounted from an overhead carriage;
   means for selectively producing movement of the carriage and arms to at least partly circumnavigate a vehicle under the carriage; and wherein
   each said arm comprises an elongate fluid conduit extending along substantially the entire vertical length of said arm and an elongate hollow translucent plastic sleeve enclosing said conduit, and a lighting system within said sleeve for substantially evenly illuminating the sleeve along substantially all of its length.

9. An apparatus as defined in claim 8 wherein the lighting system comprises one or more strips of LEDs extending longitudinally through the interior volume of the sleeve.

10. An apparatus as defined in claim 9 further comprising a control device for providing a program to control carriage and arm movements as well as lighting effects coordinated with said movements.

11. An apparatus as defined in claim 10 wherein the LEDs are selected and wired so as to be capable of providing different colors.

12. An apparatus as defined in claim 11 wherein the colors are red, green and blue and combinations thereof.

13. An apparatus as defined in claim 8 further comprising a sign including a plurality of individual indicia areas representing different phases of a car wash sequence and means for illuminating the sections in accordance with a car wash step being performed at any given time.

14. An apparatus as defined in claim 8 further comprising an overhead rail system; said carriage being mounted for controlled movement along said rail system over a car wash bay, the spray arms being dependently mounted to the carriage for movement therewith in the course of a sequential car wash operation.

15. The spray-type car wash system as defined in claim 8 further comprising breakaway joints for mounting said arms to said carriage.

\* \* \* \* \*